United States Patent
Morris

(10) Patent No.: US 8,714,493 B2
(45) Date of Patent: May 6, 2014

(54) TRAILING EDGE FLAP

(75) Inventor: Stuart Morris, Bristol (GB)

(73) Assignee: Airbus Operations Limited, Bristol (GB)

( * ) Notice: Subject to any disclaimer, the term of this patent is extended or adjusted under 35 U.S.C. 154(b) by 121 days.

(21) Appl. No.: 12/939,211

(22) Filed: Nov. 4, 2010

(65) Prior Publication Data

US 2011/0127386 A1     Jun. 2, 2011

(30) Foreign Application Priority Data

Nov. 27, 2009   (GB) .................................. 0920968.5

(51) Int. Cl.
*B64C 3/50*         (2006.01)
*B64C 3/54*         (2006.01)

(52) U.S. Cl.
USPC ............................ 244/215; 244/218; 244/213

(58) Field of Classification Search
USPC .................................. 244/211–217, 219, 218
See application file for complete search history.

(56) References Cited

U.S. PATENT DOCUMENTS

| | | | | |
|---|---|---|---|---|
| 1,392,005 | A | * | 9/1921 | Fowler .......................... 244/218 |
| 1,736,300 | A | * | 11/1929 | Wilford ........................ 244/218 |
| 2,137,879 | A | * | 11/1938 | Ksoll ........................... 244/216 |
| 2,146,014 | A | * | 2/1939 | Grant ............................ 244/216 |
| 2,222,187 | A | * | 11/1940 | Weatherbee ................... 244/216 |
| 2,254,304 | A | * | 9/1941 | Miller ........................... 244/216 |
| 2,591,000 | A | * | 4/1952 | O'Brien ........................ 244/216 |
| 3,447,761 | A | * | 6/1969 | Wadleigh et al. .............. 244/218 |
| 3,493,197 | A | * | 2/1970 | Spearman ...................... 244/218 |
| 3,655,149 | A | * | 4/1972 | Williams ....................... 244/225 |
| 3,721,406 | A | * | 3/1973 | Hurlbert ........................ 244/216 |
| 3,977,630 | A | * | 8/1976 | Lewis et al. ................... 244/216 |
| 4,025,007 | A | * | 5/1977 | Kaniut .......................... 244/218 |
| 4,049,219 | A | * | 9/1977 | Dean et al. .................... 244/217 |
| 4,460,138 | A | * | 7/1984 | Sankrithi ....................... 244/218 |
| 4,702,442 | A | * | 10/1987 | Weiland et al. ................ 244/216 |
| 4,796,840 | A | * | 1/1989 | Heynatz ........................ 244/215 |
| 5,098,043 | A | * | 3/1992 | Arena ........................... 244/215 |
| 5,127,605 | A | * | 7/1992 | Atchison et al. .............. 244/218 |
| 5,312,070 | A | * | 5/1994 | Arena ........................... 244/218 |
| 5,651,513 | A | * | 7/1997 | Arena ........................... 244/215 |

(Continued)

FOREIGN PATENT DOCUMENTS

GB         2425100 A       10/2006

OTHER PUBLICATIONS

UK Search Report for Application No. GB0920968.5 mailed Mar. 8, 2010.

*Primary Examiner* — Tien Dinh
*Assistant Examiner* — Steven Hawk
(74) *Attorney, Agent, or Firm* — Lowe Hauptman & Ham, LLP

(57) ABSTRACT

A single slotted trailing edge flap arrangement for an aircraft wing, comprising a main flap element and an auxiliary flap element sealed to and supported by the main flap element for movement between a retracted and an extended position relative to the main flap element so as to vary the planform area of the flap. The auxiliary flap element remains sealed to the main flap element when in its extended position, and movement of the auxiliary flap element relative to the main flap element is solely translational. The auxiliary flap element may be translationally deployed from the main flap element by sliding the auxiliary flap element out from the underside of the main flap element. Also, a method of operating the flap arrangement.

16 Claims, 1 Drawing Sheet

(56) References Cited

U.S. PATENT DOCUMENTS

| | | | |
|---|---|---|---|
| 6,079,672 A * | 6/2000 | Lam et al. | 244/218 |
| 6,123,297 A * | 9/2000 | Berry | 244/214 |
| 6,981,676 B2 * | 1/2006 | Milliere | 244/218 |
| 7,367,532 B2 * | 5/2008 | Libby | 244/216 |
| 7,520,471 B2 * | 4/2009 | Reckzeh et al. | 244/215 |
| 7,600,718 B2 * | 10/2009 | Perez-Sanchez | 244/215 |
| 7,661,630 B2 * | 2/2010 | Libby | 244/216 |
| 7,891,611 B2 * | 2/2011 | Huynh et al. | 244/215 |
| 2005/0230565 A1 * | 10/2005 | Kallinen | 244/217 |
| 2009/0108142 A1 * | 4/2009 | Wright et al. | 244/215 |
| 2010/0059633 A1 * | 3/2010 | Pohl | 244/215 |
| 2010/0286849 A1 * | 11/2010 | Huynh et al. | 244/215 |
| 2010/0308162 A1 * | 12/2010 | Gartelmann | 244/99.3 |

* cited by examiner

TRAILING EDGE FLAP

RELATED APPLICATIONS

The present application is based on, and claims priority from, Great Britain Application Number 0920968.5, filed Nov. 27, 2009, the disclosure of which is hereby incorporated by reference herein in its entirety.

FIELD OF THE INVENTION

The present invention relates to a trailing edge flap arrangement for an aircraft wing. The invention also relates to a method of operating a trailing edge flap arrangement.

BACKGROUND OF THE INVENTION

Aircraft wing trailing edge flaps are high lift devices which are typically deployed on take-off and landing to increase the lift coefficient by increasing the camber of the wing aerofoil. This can be achieved by rotating the flap downwardly about its hinge line with respect to the fixed wing portion. Some flaps, for example the Fowler flap, further increase the lift generated by the wing by also increasing the planform area of the wing. This is achieved by moving the flap along a track such that the flap moves aft and rotates downwardly when deployed. A "drop hinge flap" is a further type of flap having a hinge point typically below the fixed wing trailing edge, such that the flap moves aft and down with respect to the fixed wing as it rotates downwardly about its hinge point.

A single slotted flap arrangement is generally preferred as this provides a simple, lightweight solution. These are beneficial for take-off but suffer performance losses at the higher deflections required for landing. Within an aircraft family, these performance losses can be acceptable on lightweight variants but higher weight variants may demand double or triple slotted flap arrangements to generate the necessary lift. Many multi-slotted flap arrangements are known but drop hinge flap arrangements are limited to a single slot due to their single hinge point. Accordingly, it can be necessary for aircraft manufacturers to adopt a completely different flap arrangement for use on higher weight aircraft variants within a family, which is undesirable.

SUMMARY OF THE INVENTION

A first aspect of the invention provides a single slotted trailing edge flap arrangement for an aircraft wing, comprising a main flap element and an auxiliary flap element sealed to and supported by the main flap element for movement between a retracted position and an extended position relative to the main flap element so as to vary the planform area of the flap, wherein the auxiliary flap element remains sealed to the main flap element when in its extended position, and wherein the movement of the auxiliary flap element relative to the main flap element is solely translational.

A further aspect of the invention provides a method of operating a single slotted trailing edge flap arrangement on an aircraft wing, the flap arrangement including a main flap element and an auxiliary flap element sealed to and supported by the main flap element for movement between a retracted position and an extended position relative to the main flap element, the method comprising: adjusting the flap arrangement to a first configuration in which the main flap element and the auxiliary flap element are retracted; adjusting the flap arrangement to a second configuration in which the main flap element is extended so as to open up a slot with the wing, and the auxiliary flap element is retracted; and adjusting the flap arrangement to a third configuration in which the main flap element is extended so as to open up a slot with the wing, and the auxiliary flap element is moved to its extended position by solely translational movement relative to the main flap element so as to increase the planform area of the flap, and the auxiliary flap element remains sealed to the main flap element.

The invention is advantageous in that a simple single slotted flap arrangement can be modified with relatively few changes to provide the greater lift that may be required for higher weight aircraft variants.

The flap arrangement may be used with either a kinematic track or linkage arrangement. The main flap element may be supported by the track, or by the linkage arrangement, from the aircraft wing for movement relative to the wing. In one embodiment, the linkage arrangement includes a drop link as part of a drop hinge mechanism. An actuator can be used to move the main flap element relative to the wing. In the single slotted flap arrangement, the slot is opened up between the wing and the main flap element as it moves from its retracted position to its extended position.

The auxiliary flap element may take an aerofoil profile or a plate-like profile, for example. The plate-like profile advantageously occupies a small volume and yet provides the increased planform area desired for the flap when extended. The auxiliary flap element is preferably supported by a rail mounted to the main flap element. An actuator may be provided for moving the auxiliary flap element relative to the main flap element. Preferably, the actuator is a linear actuator. For simplicity, the actuator may be adapted to discretely move the auxiliary flap element between extended and retracted positions. Alternatively, the actuator may be adapted to infinitely vary the position of the auxiliary flap element between its extended and retracted positions.

The flap arrangement is preferably in the first configuration during cruise, in the second configuration during take off, and in the third configuration during landing. The main flap element may be partially extended when the flap arrangement is in the second configuration, and fully extended when the flap arrangement is in the third configuration.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
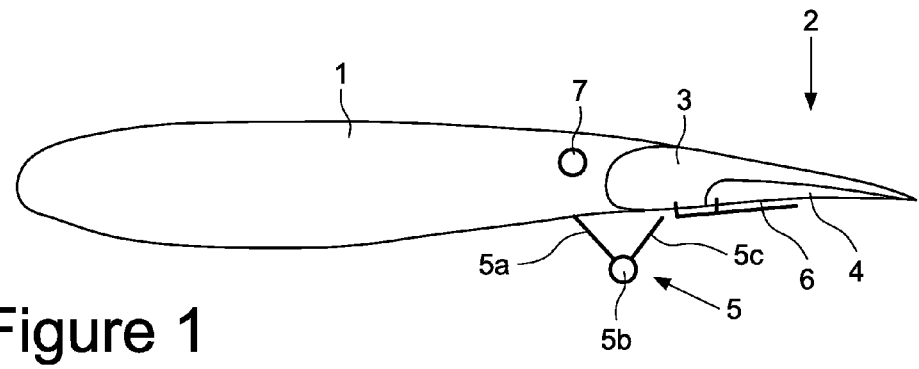
FIG. 1 illustrates schematically a cross section through an aircraft wing having a trailing edge flap arrangement in accordance with the invention shown in its retracted position.

FIG. 1 shows an aircraft wing including a main fixed wing portion 1 and a single slotted trailing edge flap arrangement 2. The flap arrangement 2 includes a main element 3 and an auxiliary flap element 4 supported by the main flap element 3.

The main flap element 3 is pivotally supported from the fixed wing portion 1 by a drop hinge linkage arrangement 5. The drop hinge linkage arrangement includes a fixed strut 5a, a hinge point 5b and a drop link 5c. The fixed strut 5a is mounted to the fixed wing portion 1 and carries the hinge point 5b. The drop link 5c connects the main flap element 3 to the hinge point 5b.

The auxiliary flap element 4 is supported by a rail 6 mounted to the main flap element 3. The auxiliary flap element 4 is slidably disposed upon the rail 5 for translational movement relative to the main flap element 3.

FIG. 1 shows the flap arrangement 2 in its retracted position. The main flap element 3 is stowed, tucked against the trailing edge of the fixed wing portion 1. The auxiliary flap element 4 is stowed in a forward position so as to be nested beneath the rear of the main flap element 3. When stowed, the auxiliary flap element 4 completes the aerofoil profile of the main flap element 3. The trailing edges of the main and auxiliary flap elements 3 and 4 are substantially coincident when the auxiliary flap element is in its retracted, stowed position.

Figure 2:
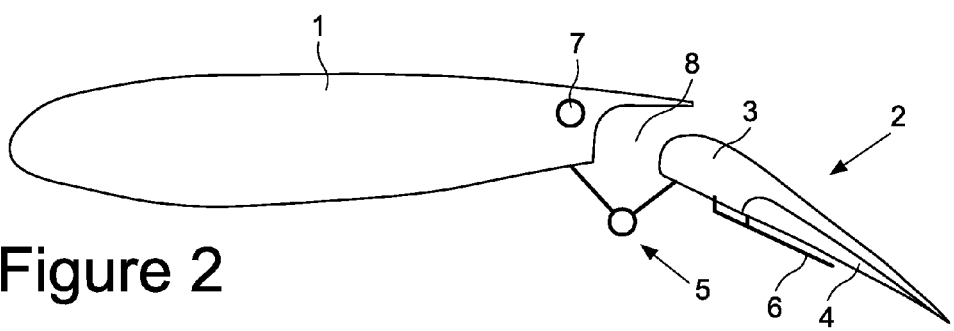
FIG. 2 illustrates the aircraft wing with the flap arrangement partially deployed.

FIG. 2 illustrates the flap arrangement 2 in its partially extended position. The main flap element 3 is deployed by rotating it downwardly using the drop hinge mechanism 5. Movement of the main flap element 3 is effected by rotary actuator 7, which is connected by a linkage arrangement (not shown) to the main flap element 3. As can be seen from FIG. 2, the auxiliary flap element 4 can remain in its stowed, fully forward position as the main flap element 3 is deployed. In this partially extended configuration, the flap arrangement 2 functions substantially identically to a standard drop hinge flap arrangement. With the main flap element 3 extended by rotation about the drop hinge mechanism 5, a slot 8 is opened up between the fixed wing portion 1 and the main flap element 3. The single slotted flap configuration shown in FIG. 2 enables high pressure air from the lower wing surface to pass through the slot 8 to energise the boundary layer over the upper surface of the main flap element 3 so as to postpone stall in a conventional manner.

Figure 3:
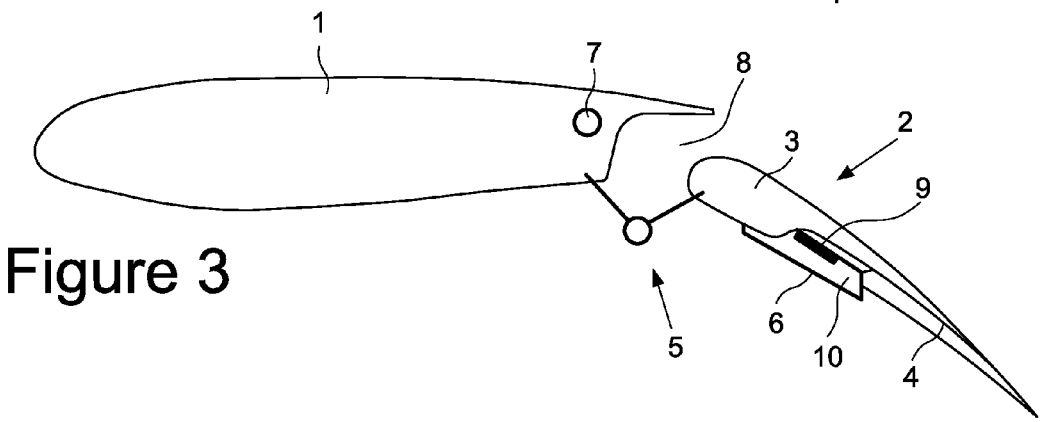
FIG. 3 illustrates the aircraft wing with the flap arrangement fully deployed.

Turning now to FIG. 3, the flap arrangement 2 is shown in its fully extended position. The main flap element 3 has been rotated a little farther downwardly about the drop hinge mechanism 5 by the actuator 7, and the auxiliary flap element 4 is now in its extended position. Movement of the auxiliary flap element 4 with respect to the main flap element 3 along the rail 6 is effected by linear actuator 9. With the auxiliary flap element 4 in its extended position, the trailing edge of the auxiliary flap element 4 is disposed substantially aft of the trailing edge of the main flap element 3. The planform area of the flap arrangement 2 is thereby significantly increased by deploying the auxiliary flap element 4 to its extended position. Movement of the auxiliary flap element 4 to its extended position is solely a translational motion. There is no relative rotational movement between the auxiliary flap element 4 and the main flap element 3 during deployment of the auxiliary flap element 4.

The auxiliary flap element 4 is sealed to the main flap element 3. In other words, no secondary through slot is opened up between the main and auxiliary flap elements 3 and 4 by deploying the auxiliary flap element 4 to its extended position. Increasing the planform area of the flap arrangement 2 by deploying the auxiliary flap element 4 increases the lift performance of the flap arrangement 2. There will be a marginal increase in drag due to the cavity 10 opened up in the lower surface of the flap arrangement 2 when the auxiliary flap element 4 is deployed but this will be more than offset in performance terms by the increase in lift generated by increasing the planform area of the deployed flap.

The auxiliary flap element 4 shown in the Figures has an aerofoil profile. The auxiliary flap element could instead take a substantially flat, plate-like profile. This would reduce the volume of the auxiliary flap element. The cavity 10 which opens up would be significantly reduced if a plate-like profile is employed.

The configuration shown in FIG. 1 with the flap arrangement in its retracted position is for use during cruise. The configuration depicted in FIG. 2 with the main flap element deployed and the auxiliary flap element stowed may be used for take off. The configuration depicted in FIG. 3 with the main flap element and the auxiliary flap element both in their deployed positions may be used for landing or heavy take off.

Figure 4:
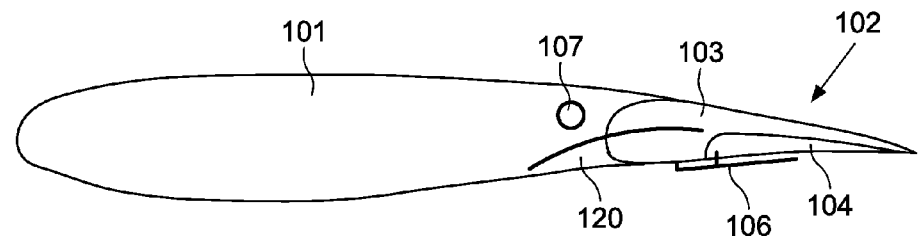
FIG. 4 illustrates another embodiment of the aircraft wing having an alternative flap deployment mechanism.

FIG. 4 illustrates an alternative embodiment of the present invention. The wing shown in FIG. 4 has many features in common with the embodiment described with reference to FIGS. 1 to 3 and similar components are denoted by similar reference numerals but numbered in the 100 series. The only difference between the embodiment of FIG. 4 and the embodiment of FIGS. 1 to 3 is that the drop hinge mechanism 5 is omitted and the main flap element 103 is supported by a kinematic track mechanism 120 for movement relative to the fixed wing portion 101. Movement of the main flap element 103 between its retracted and extended positions is effected by rotary actuator 107. The kinematic flap track mechanism 120 is conventional and so will not be described in detail here.

The auxiliary flap element 104 is slidably mounted via a rail 106 to the main flap element 103, and is moveable under control of a linear actuator in an identical manner to the embodiment described with reference to FIGS. 1 to 3. Whilst FIG. 4 depicts the flap arrangement 102 in its retracted position it will be appreciated by those skilled in the art that the extended positions for the main flap element 103 and the auxiliary flap element 104 are substantially identical to those positions of corresponding components of the flap arrangement depicted in FIGS. 1 to 3.

Although the invention has been described above with reference to one or more preferred embodiments, it will be appreciated that various changes or modifications may be made without departing from the scope of the invention as defined in the appended claims.

The invention claimed is:

1. A single slotted trailing edge flap arrangement for an aircraft wing, comprising:
 a main flap element and a first actuator for moving the main flap element relative to the wing,
 an auxiliary flap element sealed to and supported by the main flap element for movement between a retracted position and an extended position relative to the main flap element so as to vary the planform area of the flap, and a second actuator for moving the auxiliary flap element between the extended position and the retracted position independently of the movement of the main flap element by the first actuator,
 wherein the auxiliary flap element remains in contact with the main flap element when the auxiliary flap element is in its extended position, and wherein the movement of the auxiliary flap element relative to the main flap element is solely translational.

2. A flap arrangement according to claim 1, further comprising a linkage arrangement or kinematic track supporting the main flap element from the aircraft wing for movement relative to the wing.

3. A flap arrangement according to claim 2, wherein the linkage arrangement includes a drop link.

4. A flap arrangement according to claim 1, wherein the main flap element is moveable between a retracted position and an extended position in which a slot is opened up between the wing and the main flap element.

5. A flap arrangement according to claim 1, wherein the auxiliary flap element is supported by a rail mounted to the main flap element.

6. A flap arrangement according to claim 1, wherein the second actuator is a linear actuator.

7. A method of operating a single slotted trailing edge flap arrangement on an aircraft wing, the flap arrangement including a main flap element, a first actuator for moving the main flap element relative to the wing, an auxiliary flap element sealed to and supported by the main flap element for movement between a retracted position and an extended position, and a second actuator for moving the auxiliary flap element between the extended position and the retracted position of the auxiliary flap element relative to the main flap element, the method comprising:
- adjusting the flap arrangement to a first configuration in which the main flap element and the auxiliary flap element are retracted;
- adjusting the flap arrangement to a second configuration in which the main flap element is extended using the first actuator so as to open up a slot with the wing, and the auxiliary flap element is retracted; and
- adjusting the flap arrangement to a third configuration in which the main flap element is extended using the first actuator so as to open up a slot with the wing, and the auxiliary flap element is moved using the second actuator to its extended position by solely translational movement relative to the main flap element so as to increase the planform area of the flap, and the auxiliary flap element remains sealed to the main flap element.

8. A method according to claim 7, wherein the flap arrangement is in the first configuration during cruise.

9. A method according to claim 7 wherein the flap arrangement is in the second configuration during take off.

10. A method according to claim 7, wherein the flap arrangement is in the third configuration during landing.

11. A method according to claim 7, wherein the main flap element is partially extended when the flap arrangement is in the second configuration, and is fully extended when the flap arrangement is in the third configuration.

12. An aircraft wing, comprising a main fixed wing portion and a single slotted trailing edge flap arrangement wherein the flap arrangement comprises a main flap element supported from the main fixed wing portion and moveable between a retracted position and an extended position in which a single slot is opened up between the main fixed wing portion and the main flap element; a first actuator for moving the main flap element between the retracted position and the extended position; an auxiliary flap element sealed to and supported by the main flap element for movement between a retracted position and an extended position relative to the main flap element so as to vary the planform area of the flap; and a second actuator for moving the auxiliary flap element between the extended position and the retracted position of the auxiliary flap element independently of the movement of the main flap element by the first actuator, wherein the auxiliary flap element remains sealed to the main flap element when in its extended position, and wherein the movement of the auxiliary flap element relative to the main flap element is solely translational.

13. A flap arrangement according to claim 1, wherein the movement of the auxiliary flap element relative to the main flap element is solely translational along a longitudinal axis.

14. A flap arrangement according to claim 1, wherein said auxiliary flap element and the main flap element maintain a continuous upper aerodynamic surface when the auxiliary flap moves between the retracted position and the extended position.

15. A method according to claim 7, wherein the movement of the auxiliary flap element relative to the main flap element is solely translational along a longitudinal axis.

16. A method according to claim 7, wherein said auxiliary flap element and the main flap element maintain a continuous upper aerodynamic surface when the auxiliary flap moves between the retracted position and the extended position.

* * * * *